United States Patent [19]

Erpenbeck

[11] 4,092,775

[45] June 6, 1978

[54] MANUAL WINDOW SHADE ROLLER CUT OFF KNIFE

[75] Inventor: Paul J. Erpenbeck, Grand Rapids, Mich.

[73] Assignee: Breneman, Inc., Cincinnati, Ohio

[21] Appl. No.: 662,341

[22] Filed: Mar. 1, 1976

[51] Int. Cl.[2] ...................... B23D 21/06; B26B 27/00; B26D 3/16

[52] U.S. Cl. .......................................... 30/95; 30/91.2

[58] Field of Search ................. 30/96, 95, 94, 93, 91.2

[56] References Cited

U.S. PATENT DOCUMENTS

| | | | |
|---|---|---|---|
| 717,800 | 1/1903 | Bell | 30/94 |
| 1,763,299 | 6/1930 | Galbraith | 30/95 |
| 2,410,901 | 11/1946 | Ramsey | 30/94 X |
| 2,817,255 | 12/1957 | Lormeau | 30/91.2 |
| 2,869,413 | 1/1959 | Anderson | 30/94 X |
| 2,903,064 | 9/1959 | Blonder | 30/94 X |

*Primary Examiner*—Gary L. Smith
*Assistant Examiner*—J. T. Zatarga
*Attorney, Agent, or Firm*—Price, Heneveld, Huizenga & Cooper

[57] ABSTRACT

An apparatus and method for cutting rolled window shades, and the rollers on which they are mounted, includes a cutting member with a cutting edge and a support member with a supporting bed rotationally coupled to each other by a pin and elastically biased toward each other. Each member has a handle with a finger indentation to provide for turning of the cutting device circumferentially around a shade and roller positioned perpendicularly between the members, at a location where a cut is desired.

6 Claims, 3 Drawing Figures

MANUAL WINDOW SHADE ROLLER CUT OFF KNIFE

BACKGROUND OF THE INVENTION

1. Field of the Invention

This invention relates generally to shade cutting devices and methods; and, more particularly, to portable, relatively simple and inexpensive devices for trimming shades to desired widths using a method of rotational cutting.

2. Prior Art

The prior art teaches various apparatus and methods for adjusting the width of a window shade so that it will fit properly in a window of a particular size. Various heavy, stationary lathe-type cutting machines are known and used at permanent locations, such as stores selling window shades, to cut rolled window shades and their rollers to desired lengths. Such machines are relatively complex to operate and relatively expensive. Further, since such machines are located away from the window where a shade is to be mounted, direct measurement of the window shade by placing the window shade against the window is typically not possible and indirect measurement, increasing the possibility of error, must be relied upon. Undesirable consequences can include waste of a window shade cut too short and the need for returning to the store for a second trimming operation of a window shade cut too long.

The prior art also teaches portable window shade trimming devices, often having a relatively complex structure. Further, their relative expense makes them more suitable for tradesmen making relatively frequent use of a trimming device than for single or occasional use by a window shade consumer. The cost of such a portable trimming device in relation of the cost of a window shade is relatively significant and undesirably high for only single or occasional use.

Typical methods of operation of the apparatus of the prior art involved either a relatively complex set up of the stationary shade trimming machine or a relatively skilled operation of a portable trimming device. It would be desirable to have a relatively simple and fool proof method to be used by an untrained person at the location of the shade installation. The method should be easy to execute, provide adequate safety and produce a cut shade with an acceptable appearance.

SUMMARY OF THE INVENTION

A manual shade cutter has an elongated cutting member having a first extremity rotationally coupled to an elongated supporting member and a second extremity including a cutting indentation comprising curved concave surface adapted to be engaged and pulled by a finger in the cutting of a shade and roller positioned between the cutting member and the supporting member. The elongated supporting member also an indentation with a curved concave surface adapted to be engaged by a finger to apply a force for cutting a shade.

As a first step in using the shade cutter, the shade is positioned between the supporting member and the cutting member, substantially perpendicular to the longitudinal axis of the cutting member. A force is manually applied to the cutting indentation in the cutting member, thereby rotating the cutter device around the shade and roller and causing a cutting action on the shade with force applied in opposition to an elastic biasing force continuously urging the cutting member toward the supporting member. The cutting member is rotated relative to the shade and roller in order to apply a cutting action around the entire circumference of the shade.

The shade cutter is of such simplicity from a manufacturing and assembly point of view that it can be supplied to the purchaser of a shade for use at home at very low cost to the seller. Also, the operation of the shade cutter is simple enough for an untrained person to use, and it produces a cut shade having a very satisfactory appearance. In particular, the relative rotation of the shade cutter to the shade produces a cut which has an essentially perfect straight edge and avoids undesirable scalloped edge. The ability of the window shade purchaser to be able to trim a window shade at the location of the window is advantageous because, typically, greater accuracy can be obtained by directly measuring the shade against the window instead of transferring measurements by such means as a yard stick.

DRAWINGS

DETAILED DESCRIPTION

Figure 1:
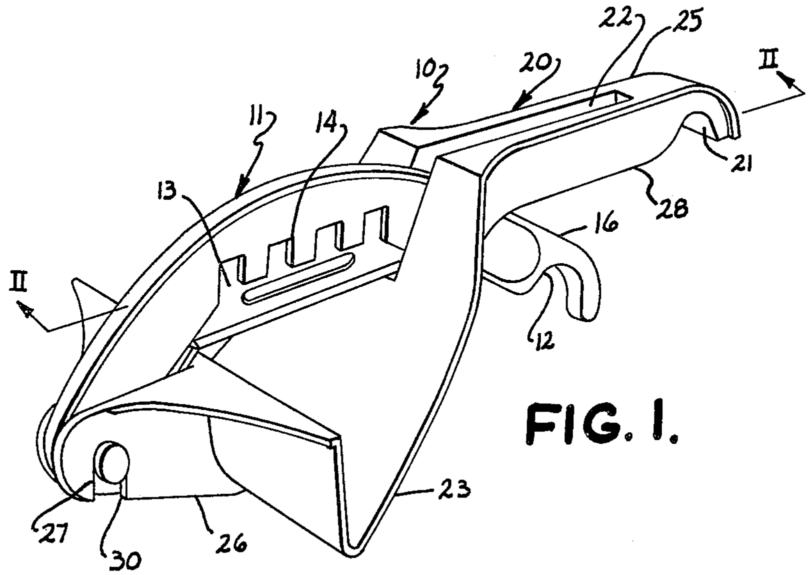
FIG. 1 is a perspective view of a shade cutter in accordance with an embodiment of this invention.
Figure 2:
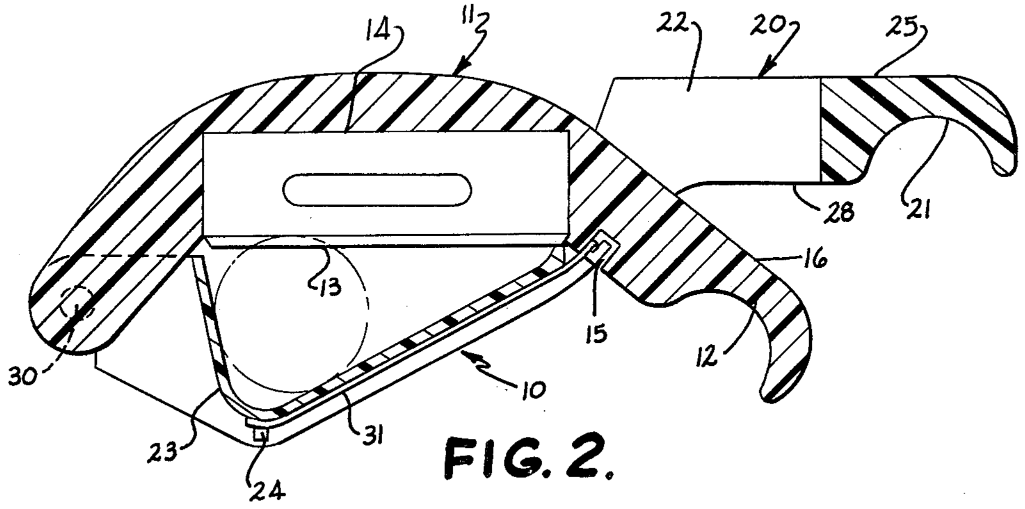
FIG. 2 is a cross-sectional view along section line 2—2 of FIG. 1, showing the shade cutter thereof together with a shade and roller indicated in phantom.

Referring to the drawings, a shade cutter 10 has a cutting member 11 pivotably connected at a connecting pin 30 to a supporting member 20. Cutting member 11 has a generally arcuate shape with connecting pin 30 at one extremity and a cutting member handle 16 at a second extremity. Cutting member handle 16 includes a cutting indentation 12 having a generally concave surface for receiving a finger for applying a force to cutting member 11. Between cutting member handle 16 and connecting pin 30 is a blade connector 14 supporting a blade 13 in position to cut a shade (as indicated in FIG. 2) located between supporting member 20 and cutting member 11. Blade connector 14 is a narrow longitudinal slot in cutting member 11 opening toward supporting member 20 and having a front longitudinal wall with spaced protrusions for gripping a portion of blade 14 against a back longitudinal wall, thereby securing blade 14.

Figure 3:
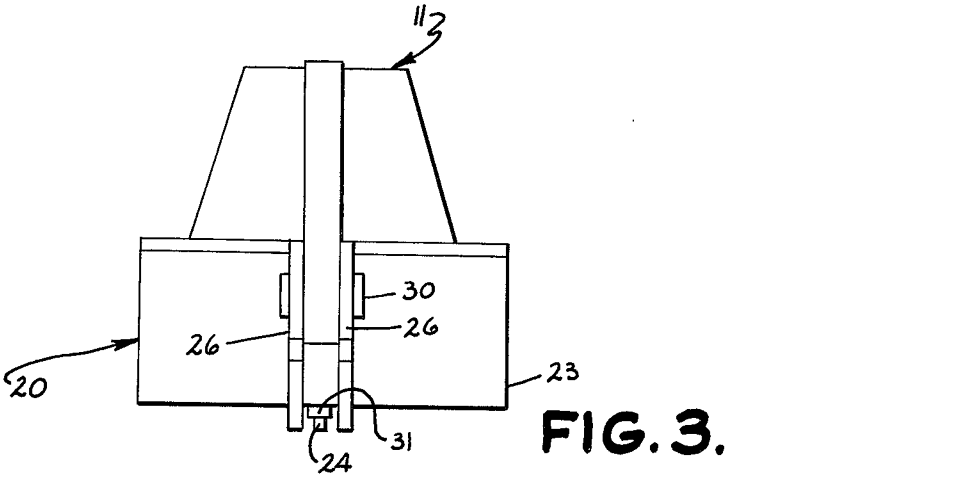
FIG. 3 is an end elevation view of the shade cutter in accordance with the preceeding figures.

At the pivotal connection between cutting member 11 and supporting member 20, supporting member 20 has a pair of spaced flanges 26 (FIG. 3), one on each side of cutting member 11, each flange having a slot 27 for engaging a partially surrounding connector pin 30. Supporting member handle 25 includes a supporting indentation 21 having a curved concave surface adapted for receiving a finger. Intermediate supporting member handle 25 and connecting pin 30 is a bed 23 having a generally V-shape to accomodate various diameters of shades. Bed 23 is sufficiently wide in a direction perpendicular to the longitudinal axis of supporting member 20 to firmly support the cutter upon a shade placed in it. Too short a bed 23 would permit overly easy relative movement of the shade and might cause blade 13 to make a diagonal or irregular cut through the shade instead of making the desired straight perpendicular cut. A typical width of bed 23 is approximately 2 ¼ inches.

A longitudinal handle slot 22 extends completely through supporting member 20, between bed 23 and supporting indentation 21, and is bounded on the sides by handle flanges 28. Cutting member handle 16 passes through handle slot 22 at a cross-over point thereby inverting the relative positions of supporting member 20 and cutting member 11 on either side of the cross-over point. Handle slot 22 extends sufficiently toward supporting indentation 21 so that cutting member 11 can rotate free of supporting member 20.

Supporting member 20 and cutting member 11 are preferably biased toward one another, as for example by an elastic member 31 connected to supporting member 20 at a short stud or lug 24 extending outwardly from the bottom of bed 23 in a direction away from cutting member 11. Elastic member 31 is connected to cutting member 11 by a connector 15 which is preferably a notched slot cut into the bottom portion of cutting member handle 16 facing bed 23.

Supporting member 20 and cutting member 11 may advantageously be injection molded of a relatively inexpensive plastic material for ease of fabrication and to reduce cost. Advantageously, connecting pin 30 and cutting member 11 are molded as a single piece. A typical blade 13 is an industrial type heavy duty blade such as a Durham duplex blade. Elastic member 31 may simply be a conventional rubberband, although an elastic force may also be produced by the devices, such as a metal spring or other resilient means.

OPERATION

To trim off the edge of a shade by the present method and means, the shade material should be rolled about a central core such as a fiber or paper board tube, or wood rod (which may actually be the roller on which the shade is to be used). The shade and roller are inserted along V-shaped bed 23 between supporting member 20 and cutting member 11, as shown in phantom in FIG. 2, for which purpose the cutting indentation 12 may be pulled toward indentation 21 while holding handle 25 in place, thereby retracting blade 13 upward from bed 23, i.e., moving handle 16 upward within its slot 22, to the extent necessary to admit the shade and roller. The position of the desired cut on the shade is then aligned with blade 13, and the cutting of blade 13 through the shade may ensue, preferably by rotation of shade cutter 10 relative to the shade.

To begin cutting, the rolled shade is held stationary so that shade cutter 10 may be rotated about the shade, and a force is applied, preferably by a finger, to cutting indentation 12. Applying such a force in a circle causes rotation of shade cutter 10 about the shade. The force applied by blade 13 on the shade under these conditions is relatively light, to facilitate accurate initial cutting. This light force is obtained because the force applied at cutting indentation 12 is in opposition to the elastic force of elastic band 31. That is, the force of elastic band 31 tends to draw together supporting member 20 and cutting member 11, while a force applied at cutting indentation 12 tends to draw blade 13 of cutting member 11 away from bed 23 of supporting member 20.

After an initial amount of cutting has been made by applying a force to cutting indentation 12 (by which all or at least most of the shade material may be severed), the effective cutting force applied can be increased by changing the finger grip to supporting indentation 21. Such an increased application of force is particularly advantageous to cut through very thick shades, or, even more particularly, to cut off portion of the underlying shade roller, where a roller structure is used which has a telescoping or otherwise adjustable end pin arrangement. That is, the same cutting path which severs an end of the rolled shade may merely be continued onward through the roller itself, thereby shortening the roller to accommodate the trimmed, narrowed shade at the same time. Of course, applying a force to supporting indentation 21 continues to cause rotation of shade cutter 10 about the shade and roller, but it produces greater cutting force, because it does not effectively decrease the force resulting from elastic band 31, and it continuously forces the, shade and roller, carried on bed 23, into the edge of the blade 13, in effect tending to roll the shade and roller up the angularly inclined surface of the bed.

Various modifications and variations will no doubt occur to those skilled in the various arts to which this invention pertains. These and all variations which basically rely on the teachings through which this disclosure has advanced the art are properly considered within the scope of this invention as defined by the appended claims.

The embodiments of the invention in which an exclusive property or privilege is claimed are defined as follows.

1. A manual shade cutter including:

an elongated cutting member having a first extremity and a second extremity, said second extremity including a first finger indentation having a concave surface adapted to be engaged by a finger, said cutting member adapted for cutting a shade;

an elongated supporting member having a bed shaped to support a rolled shade during cutting by said cutting member, said supporting member also having a first extremity and a second extremity, said second extremity including a second finger indentation having a concave surface adapted to be engaged by a finger;

a pivot means rotationally coupling said first extremity of said cutting member to said first extremity of said supporting member;

a blade coupled to said cutting member and having a cutting edge generally aligned with a plane through the longitudinal axis of said cutting member and facing said supporting member;

said supporting member having a slotted portion intermediate said second finger indentation and said bed through which said cutting member extends generally intermediate said first finger indentation and said blade, so that applying pressure to either of said finger indentations causes rotation of both said supporting member and said cutting member about a shade supported on said bed; and resilient biasing means coupled between said cutting member and said supporting member for urging such members toward one another so that said rotation of said cutting and supporting members about The shade results in a cutting action about the periphery of the shade due to the urging by said biasing means of said blade against the shade and less cutting action occurs when finger pressure is applied to said first finger indentation than when applied to said second finger indentation.

2. A manual shade cutter as recited in claim 1 wherein:

said cutting member has a generally arcuate shape and has a generally concave exposure to said supporting member; and said supporting member has an elongated handle slot along a portion intermediate said supporting indentation and said V-shaped bed for receiving a second extremity of said cutting member, including said cutting indentation and a portion of said cutting member intermediate said cutting indentation and said blade.

3. A manual shade cutter as recited in claim 1, wherein said resilient biasing means comprises an elastic member.

4. A manual shade cutter as recited in claim 1, wherein said elastic member comprises a closed loop band, and including a connector including a notched slot extending into said cutting member and opening toward said bed, for coupling said elastic band to said cutting member; and a connector including an elongated protrusion extending outward from said supporting member away from said cutting member, for coupling said elastic band to said supporting member.

5. A manual shade cutter as recited in claim 1 wherein said connecting pin is an integral part of said cutting member and said first extremity of said supporting member includes a pair of flanges having slots, one of said flanges being on each side of said first extremity of said cutting member and said connecting pin being engaged by said slots.

6. A manual shade cutter including:

an elongated cutting member for cutting a shade, said member having a generally arcuate shape and a first extremity and a second extremity, said second extremity including a first finger indentation having a curved concave surface adapted to be engaged by a finger, said first extremity including an integral connecting pin disposed perpendicular to the longitudinal axis of said cutting member;

an elongated supporting member for supporting a shade during said cutting by said cutting member, said member having a first extremity and a second extremity, said second extremity including a second finger indentation having a curved concave surface adapted to be engaged by a finger, said first extremity including a pair of flanges having slots, one of said flanges being on each side of said first extremity of said cutting member and said connecting pin being engaged by said slots thereby rotationally coupling said cutting and supporting members;

a blade connector including a slotted opening in said cutting member facing said supporting member;

a blade coupled to said blade connector and oriented to have a cutting edge aligned with a plane generally parallel to the length of said cutting member and within a concave portion of said cutting member and facing said supporting member;

a generally V-shaped bed comprising a relatively wider portion of said supporting member for supporting the shade, having any of a plurality of diameters, against said blade so the longitudinal axis of the shade is at a substantially right angle to the longitudinal axis of said blade;

an elongated handle slot along a portion of said supporting member intermediate said second finger indentation and said V-shaped bed for passing said second extremity of said cutting member, including said first finger indentation and a portion of said cutting member intermediate said first finger indentation and said blade, so that applying pressure to said first finger indentation causes rotation of both said cutting member and said supporting member about a shade supported on said bed;

an elastic band coupled between said cutting member and said supporting member for urging said blade and said bed toward one another so that the cooperating rotation of said cutting and supporting members about the shade results in a cutting action about the periphery of the shade by said blade;

said connecting pin is an integral part of said cutting member and said first extremity of said supporting member includes a pair of flanges having slots, one of said flanges being on ach side of said first extremity of said cutting member and said connecting pin being engaged by said slots;

a first band connector including a notched slot extending into said cutting member and opening toward said bed, for coupling said elastic band to said cutting member; and a second band connector including an elongated protrusion extending outward from said bed of said supporting member away from said cutting member, for coupling said elastic band to said supporting member.

* * * * *